(12) United States Patent
Tyson et al.

(10) Patent No.: US 9,195,869 B2
(45) Date of Patent: Nov. 24, 2015

(54) THEME PARK PHOTOGRAPH TRACKING AND RETRIEVAL SYSTEM FOR PARK VISITORS AND ASSOCIATED METHODS

(71) Applicant: COLORVISION INTERNATIONAL, INC., Orlando, FL (US)

(72) Inventors: Henry Tyson, Orlando, FL (US); Mark Simmons, Orlando, FL (US); Bryan Wilkins, Orlando, FL (US)

(73) Assignee: COLORVISION INTERNATIONAL, INC., Orlando, FL (US)

( * ) Notice: Subject to any disclaimer, the term of this patent is extended or adjusted under 35 U.S.C. 154(b) by 254 days.

(21) Appl. No.: 13/673,142

(22) Filed: Nov. 9, 2012

(65) Prior Publication Data

US 2013/0119123 A1     May 16, 2013

Related U.S. Application Data

(60) Provisional application No. 61/558,139, filed on Nov. 10, 2011.

(51) Int. Cl.
| | |
|---|---|
| *G06F 17/00* | (2006.01) |
| *G06K 7/14* | (2006.01) |
| *G06F 17/30* | (2006.01) |
| *H04N 1/00* | (2006.01) |
| *H04N 1/21* | (2006.01) |

(52) U.S. Cl.
CPC ........ *G06K 7/1404* (2013.01); *G06F 17/30265* (2013.01); *H04N 1/00137* (2013.01); *H04N 1/00151* (2013.01); *H04N 1/00164* (2013.01); *H04N 1/00169* (2013.01); *H04N 1/00334* (2013.01); *H04N 1/2112* (2013.01); *H04N 1/2187* (2013.01); *H04N 1/2191* (2013.01)

(58) Field of Classification Search
USPC ........................................................ 235/375
See application file for complete search history.

(56) References Cited

U.S. PATENT DOCUMENTS

| | | | | |
|---|---|---|---|---|
| 2006/0125930 | A1* | 6/2006 | Mindrum et al. | .. H04N 1/00132 348/211.3 |
| 2008/0239409 | A1* | 10/2008 | David | ............... G06F 17/30244 358/440 |
| 2010/0177212 | A1* | 7/2010 | Holmes | .................. H04N 5/772 348/231.2 |

* cited by examiner

*Primary Examiner* — Michael G Lee
*Assistant Examiner* — David Tardif
(74) *Attorney, Agent, or Firm* — Allen, Dyer, Doppelt, Milbrath & Gilchrist, P.A.

(57) ABSTRACT

A photography database is configured to interface with at least one camera and includes a memory to store pictures of distinct bar codes and of theme park guests in the order in which they were taken so that the distinct bar codes separate the respective pictures of the theme park guests. A processor is coupled to the memory to retrieve stored pictures based on the distinct bar codes being presented by the theme park guests by detecting the stored distinct bar code matching the distinct bar code presented by the theme park guest, and detecting a stored next distinct bar code that does not match the distinct bar code presented by the theme park guest. All pictures between the matching and non-matching stored distinct bar codes are retrieved. At least one display is coupled to the photography database for displaying the retrieved pictures.

17 Claims, 3 Drawing Sheets

THEME PARK PHOTOGRAPH TRACKING AND RETRIEVAL SYSTEM FOR PARK VISITORS AND ASSOCIATED METHODS

RELATED APPLICATIONS

This application claims the benefit of U.S. Provisional Application Ser. No. 61/558,139 filed Nov. 10, 2011, the entire contents of which are incorporated herein by reference.

FIELD OF THE INVENTION

The present invention relates to the field of photography, and more particularly, to a photograph tracking and retrieval system for park visitors at a theme park.

BACKGROUND OF THE INVENTION

When visiting a theme park, such as Disney and Universal, for example, it is common for park visitors to be approached by a theme park photographer to have their picture taken as a souvenir that can later be retrieved at a designated area. For each park visitor and their group having their picture taken, a printed ticket with a number corresponding to their particular picture is given to them by the theme park photographer.

The number on the printed ticket typically corresponds to a bar code that is associated with the picture or pictures taken by the theme park photographer of the park visitor and their group. A different bar code is used for each park visitor and their group having their picture taken.

To associate the bar codes with the pictures being taken, a personal digital assistant (FDA) is used. Each theme park photographer has a PDA coupled to their camera via an interface cord. The theme park photographer uses the PDA to first read or scan a bar code. The bar code is usually taken from a tablet of bar codes carried by the theme park photographer. After the pictures of a park visitor and their group have been taken, they are then transferred to the PDA. The PDA includes software that associates the bar code with the corresponding pictures taken of the park visitor. This process is repeated for each group of park visitors having their picture taken.

The theme park photographer later transfers the stored pictures and corresponding bar codes in the FDA to a photography database. Prior to leaving the theme park, the park visitor can present their printed ticket at a photography gift shop. The photography database is searched using the number on the printed ticket which corresponds to the bar code used to identify their pictures.

There are a number of drawbacks of using a PDA. If there is a break or disconnect in the interface cord, pictures cannot be downloaded from the camera to the PDA. The operating system of the PDA is not always compatible with the different camera manufacturers. Moreover, each PDA can cost several thousands of dollars.

SUMMARY OF THE INVENTION

In view of the foregoing background, an object of the present invention is to simplify operation of a theme park photograph tracking and retrieval system.

This and other objects, features, and advantages in accordance with the present invention are provided by a theme park photograph tracking and retrieval system comprising at least one bar code pad to be carried by at least one theme park photographer, with each bar code pad comprising a plurality of distinct bar codes, and with the distinct bar codes being given to theme park guests having their photograph taken. At least one camera is to be carried by the at least one theme park photographer to take pictures of the distinct bar codes and of theme park guests, with a picture of a distinct bar code being taken prior to taking at least one picture of the theme park guest.

A photography database may be configured to interface with the at least one camera and includes a memory to store the pictures of the distinct bar codes and of the theme park guests in the order in which they were taken so that the distinct bar codes separate the respective pictures of the theme park guests. A processor is coupled to the memory to retrieve stored pictures based on the distinct bar codes being presented by the theme park guests by detecting the stored distinct bar code matching the distinct bar code presented by the theme park guest, and detecting a stored next distinct bar code that does not match the distinct bar code presented by the theme park guest. All pictures between the matching and non-matching stored distinct bar codes are retrieved.

The theme park photograph tracking and retrieval system may further comprise at least one display coupled to the photography database for displaying the retrieved pictures.

The at least one camera may comprise a memory card for storing the pictures of the distinct bar codes and of theme park guests, and wherein the photography database may comprise at least one memory card slot for receiving the memory card.

The photography database may comprise an external cable interface, and wherein the at least one camera may comprises a non-removable memory for storing the pictures of the distinct bar codes and of theme park guests, and an external cable for interfacing between the non-removable memory and the external cable interface.

The photography database may be configured as a server. The pictures stored in the photography database may be in an exchangeable image file format (Rxif).

Another aspect of the invention is directed to a method for operating a theme park photograph tracking and retrieval system as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
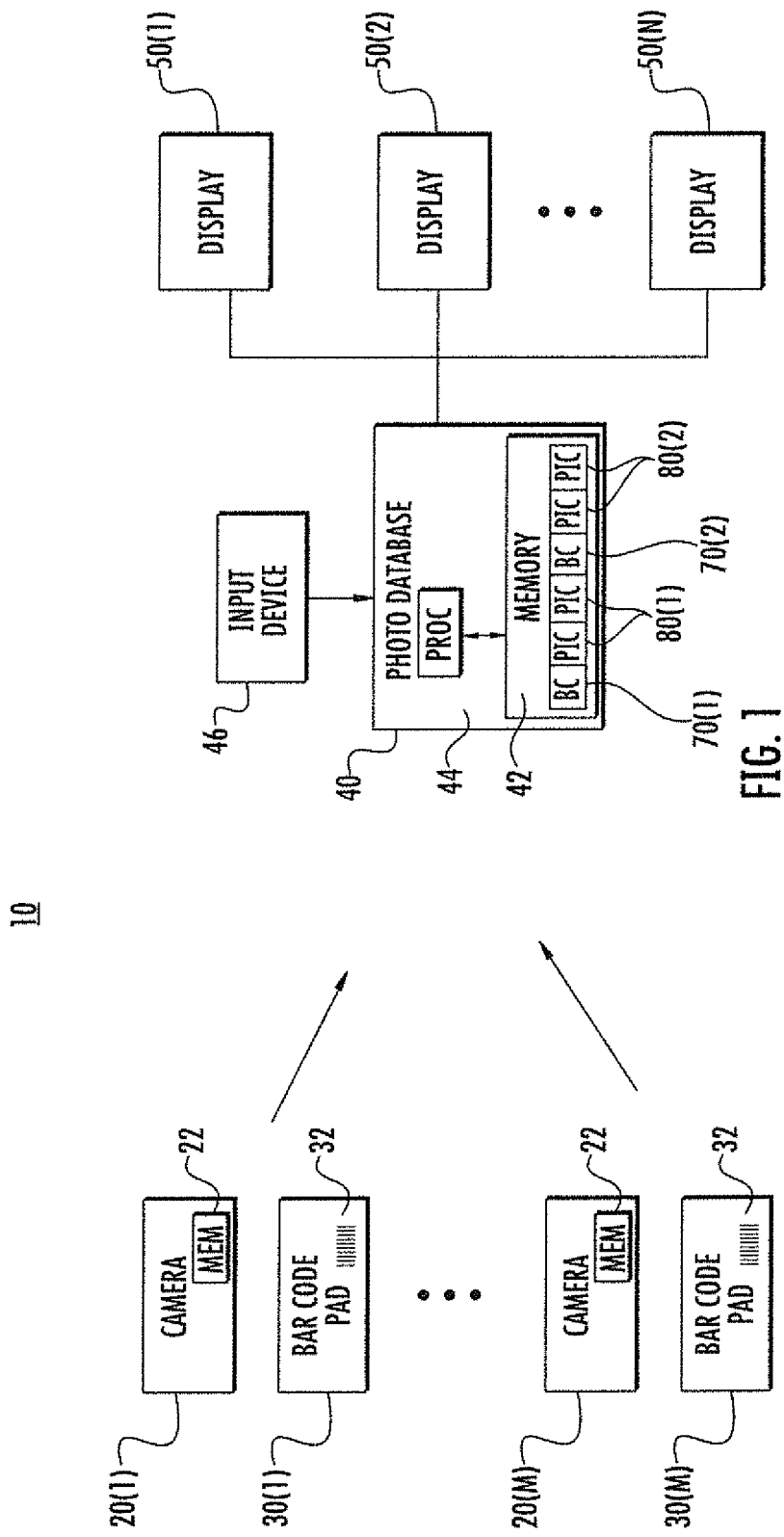
FIG. 1 is a block diagram of a theme park photograph tracking and retrieval system in accordance with the present invention.

Referring initially to FIG. 1, a theme park photograph tracking and retrieval system 10 will be discussed. Each theme park photographer carries a camera 20 and a bar code pad 30. The illustrated cameras are numbered 20(1)-20(m), but are generally referred to by reference number 20. Similarly, the illustrated bar code pads are numbered 30(1)-30(m), but are generally referred to by reference number 30.

The camera 20 may be a standard high quality digital camera, such as a Nikon or Cannon, for example. The system 10 is not limited to any particular type camera manufacturer. Each bar code pad 30 includes a plurality of distinct bar codes, such as bar code 32. The bar code pad 30 may be a ringed notepad with laminated pages, where each page includes a unique bar code. The distinct bar codes are given to theme park guests having their photograph taken. Each guest or a member within a group of guests having their picture will be given a distinct bar code 32 so as to be able to later retrieve the pictures hat were taken.

Prior to a theme park photographer taking pictures of a park visitor, a picture is first taken of a distinct bar code 32 on the bar code pad 30. This is followed by one or more pictures being taken of the park visitor. This process is repeated for each group of park visitors having their picture taken.

Each camera 20 includes a memory 22 for storing the pictures of the bar codes and the pictures of the park visitors. The memory 22 may be in the form of an internal non-removable memory or a removable memory card, or a combination of the two, as readily appreciated by those skilled in the art.

The camera 20 does not associate a particular bar code 32 to a picture, as initially performed by a PDA as discussed above. This greatly simplifies the search and retrieval process by having the camera 20 store the pictures of the bar codes and the pictures of the park visitors in the order in which they were taken.

For each park visitor and their group having their picture taken, a distinct bar code 32 corresponding to their particular picture or pictures is given to them by the theme park photographer.

Periodically throughout the day, each theme park photographer will download the contents of their camera memory 22 to a photography database 40. The memory 42 within the photography database 40 stores the pictures 70(1), 70(2) of the distinct bar codes 32 and pictures 80(1), 80(2) of the theme park guests in the order in which they were taken so that pictures 70 of the distinct bar codes separate the respective pictures 80 of the theme park guests.

The photography database 40 may be configured as a server, for example. The photography database 40 is typically in a photography gift shop located near the exit of the theme park. As the park visitors leave the theme park, they can stop by the gift shop and present their distinct bar code 32. This allows their picture or pictures to be retrieved for viewing. The distinct bar code 32 presented by the theme park guest may be read or scanned by an input device 46 coupled to the photography database 40.

Figure 2:
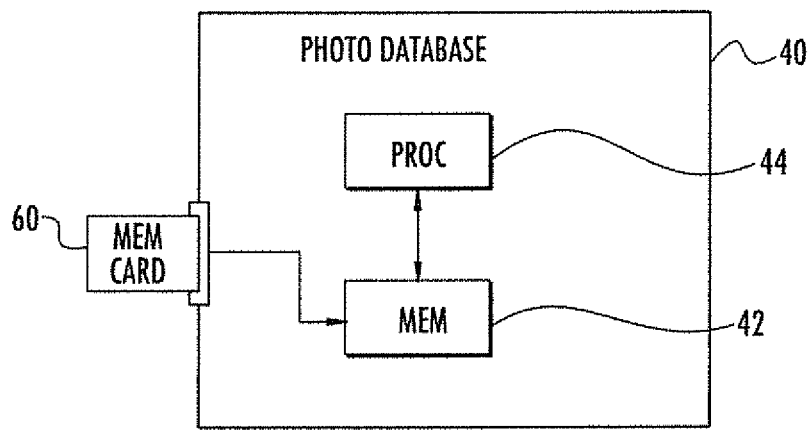
FIG. 2 is a block diagram of a memory card from a camera downloading photographs to the photograph database as shown in FIG. 1.
Figure 3:
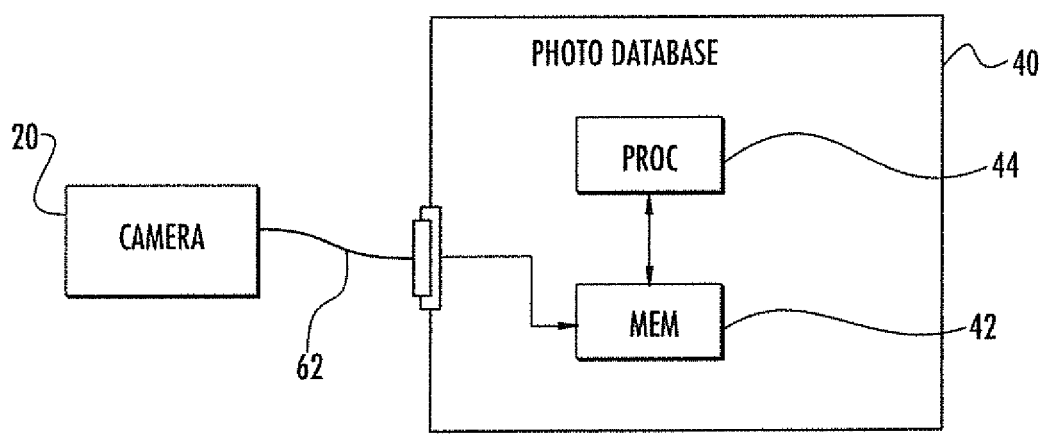
FIG. 3 is a block diagram of a camera downloading photographs via a USB cable to the photograph database as shown in FIG. 1.

If the camera memory 22 is configured as a removable memory card 60, then the memory card is inserted into a memory card slot of the photography database 40 so that the contents thereof may be transferred to the memory 42 within, as illustrated in FIG. 2. If the camera memory 22 is a non-removable memory, then a USB cable 62 is used to transfer the contents thereof to the memory 42 within the photography database 40, as illustrated in FIG. 3.

The downloaded pictures are in an exchangeable image file format (Exif). Other formats are acceptable, as readily appreciated by those skilled in the art. Exif is a standard that specifies the formats for images, sound, and ancillary tags used by digital cameras. The downloaded pictures may be based on an existing file format with the addition of specific metadata tags. The existing file format may be JPEG DCT for compressed image files or TIFF (RGB or YCbCr) for uncompressed image files, for example. For the metadata tags, the first 4 bits include the bar code information to be associated with the corresponding picture(s).

A processor 44 within the photography database 40 is configured to detect pictures of the bar codes and the pictures within the Exif files. In particular, the processor 44 detects the stored distinct bar code matching the distinct bar code presented by the theme park guest, and detects a stored next distinct bar code that does not match the distinct bar code presented by the theme park guest, with all pictures between the matching and non-matching stored distinct bar codes being retrieved.

As noted above, the memory 42 within the photography database 40 stores the pictures 70(1), 70(2) of the distinct bar codes 32 and pictures 80(1), 80(2) of the theme park guests in the order in which they were taken so that pictures of the distinct bar codes 70 separate the pictures 80 of the respective theme park guests.

When the processor 44 searches and detects the picture of a bar code 70(1) corresponding to the distinct bar code 32 as presented by a theme park guest, the processor continues to detect the picture of the next stored bar code 70(2) in the memory 42. All pictures 80(1) between the two bar code pictures 70(1), 70(2) are retrieved for viewing. One or more displays 50(1)-50(n) are coupled to the photography database 40. The retrieved pictures 80(1) may then be displayed on a selected one of the displays 50.

Figure 4:
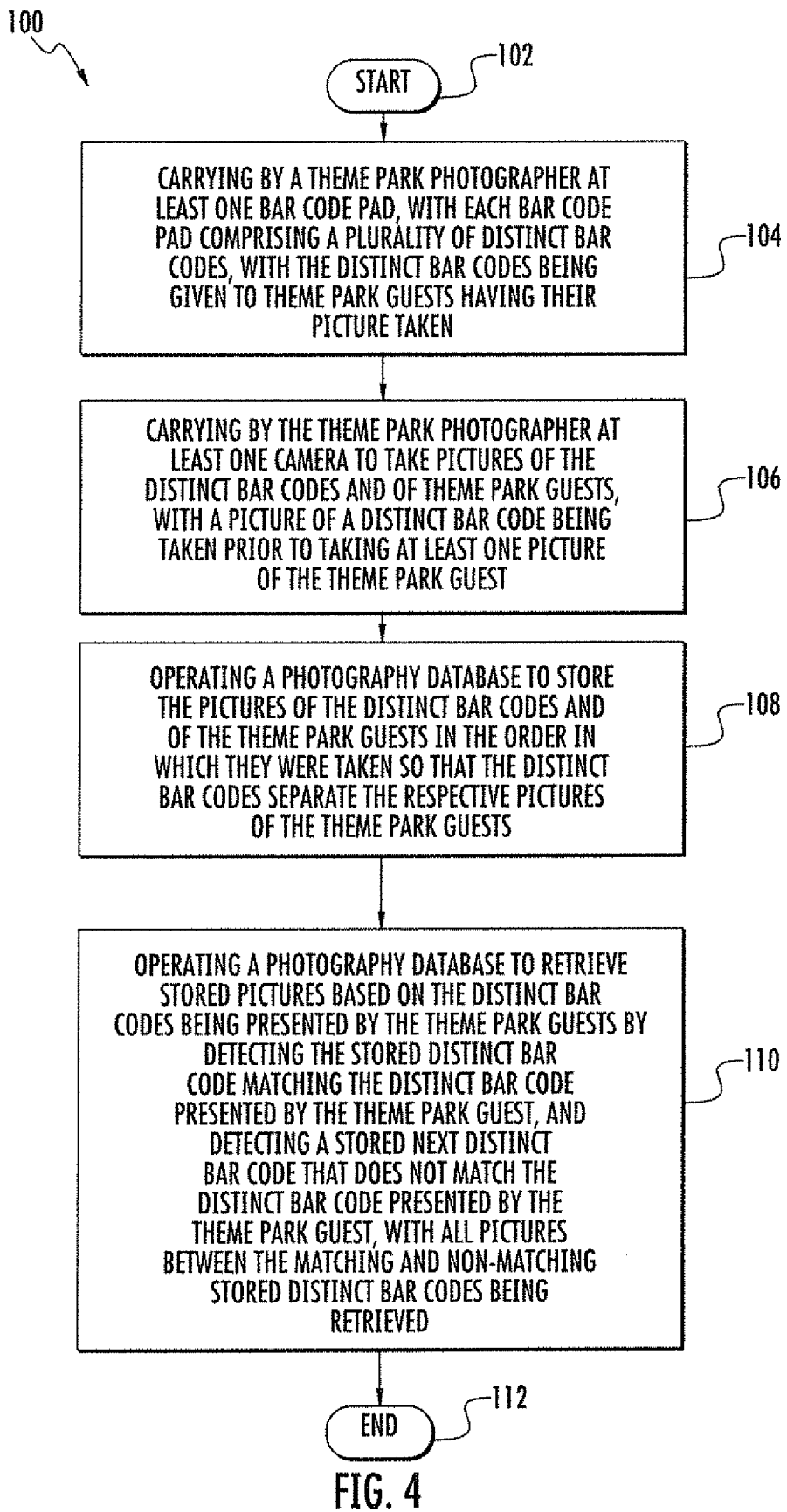
FIG. 4 is a flow chart illustrating a method for operating the theme park photograph tracking and retrieval system as shown in FIG. 1.

Another aspect of the invention is directed to a method for operating a theme park photograph tracking and retrieval system 10. Referring now to the flow chart 100 in FIG. 4, the method comprises from the start (Block 102), carrying by a theme park photographer at least one bar code pad 30 at Block 104, with each bar code pad comprising a plurality of distinct bar codes 32, with the distinct bar codes being given to theme park guests having their picture taken.

The method further comprises carrying by the theme park photographer at least one camera 20 to take pictures of the distinct bar codes 32 and of theme park guests at Block 106, with a picture of a distinct bar code being taken prior to taking at least one picture of the theme park guest.

The photography database 40 is operated to interface with the at least one camera 20 at Block 108 to store the pictures of the distinct bar codes 70(1), 70(2) and of the theme park guests 80(1), 80(2) in the order in which they were taken so that the distinct bar codes separate the respective pictures of the theme park guests.

The photography database 40 is further operated to retrieve stored pictures based on the distinct bar codes being presented by the theme park guests at Block 110. This is done by detecting a picture of the stored distinct bar code 70(1) matching the distinct bar code presented by the theme park guest, and detecting a picture of a stored next distinct bar code 70(2) that does not match the distinct bar code presented by the theme park guest, with all pictures between the matching and non-matching stored distinct bar codes being retrieved. The method ends at Block 112.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A theme park photograph tracking and retrieval system comprising:
   at least one bar code pad to be carried by at least one theme park photographer, with each bar code pad comprising a plurality of distinct bar codes, with the distinct bar codes being given to theme park guests having their photograph taken;
   at least one camera to be carried by the at least one theme park photographer to take pictures of the distinct bar codes and of theme park guests, with a picture of a distinct bar code being taken prior to taking at least one picture of the theme park guest; and
   a photography database configured to interface with said at least one camera and comprising
      a memory to store the pictures of the distinct bar codes and of the theme park guests in the order in which they were taken so that the distinct bar codes separate the respective pictures of the theme park guests, and
      a processor coupled to said memory to retrieve stored pictures based on the distinct bar codes being presented by the theme park guests by
         detecting the stored distinct bar code matching the distinct bar code presented by the theme park guest, and
         detecting a sequentially stored next distinct bar code that does not match the distinct bar code presented by the theme park guest, with all pictures between the matching distinct bar code and the non-matching sequentially stored next distinct bar code being retrieved.

2. The theme park photograph tracking and retrieval system according to claim 1 further comprising at least one display coupled to said photography database for displaying the retrieved pictures.

3. The theme park photograph tracking and retrieval system according to claim 1 wherein said at least one camera comprises a memory card for storing the pictures of the distinct bar codes and of theme park guests; and wherein said photography database comprises at least one memory card slot for receiving said memory card.

4. The theme park photograph tracking and retrieval system according to claim 1 wherein said photography database comprises an external cable interface; and wherein said at least one camera comprises a non-removable memory for storing the pictures of the distinct bar codes and of theme park guests, and an external cable for interfacing between said non-removable memory and said external cable interface.

5. The theme park photograph tracking and retrieval system according to claim 1 wherein said photography database is configured as a server.

6. The theme park photograph tracking and retrieval system according to claim 1 wherein the pictures stored in said photography database are in an exchangeable image file format (Exif).

7. A theme park photograph tracking and retrieval system comprising:
   a photography database configured to interface with at least one camera and comprising
      a memory to store pictures of distinct bar codes and of theme park guests in the order in which they were taken so that the distinct bar codes separate the respective pictures of the theme park guests, and
      a processor coupled to said memory to retrieve stored pictures based on the distinct bar codes being presented by the theme park guests by
         detecting the stored distinct bar code matching the distinct bar code presented by the theme park guest, and
         detecting a sequentially stored next distinct bar code that does not match the distinct bar code presented by the theme park guest, with all pictures between the matching distinct bar code and the non-matching sequentially stored next distinct bar code being retrieved; and
   at least one display coupled to said photography database for displaying the retrieved pictures.

8. The theme park photograph tracking and retrieval system according to claim 7 wherein the at least one camera comprises a memory card for storing the pictures of the distinct bar codes and of theme park guests; and wherein said photography database comprises at least one memory card slot for receiving said memory card.

9. The theme park photograph tracking and retrieval system according to claim 7 wherein said photography database comprises an external cable interface; and wherein the at least one camera comprises a non-removable memory for storing the pictures of the distinct bar codes and of theme park guests, and an external cable for interfacing between said non-removable memory and said external cable interface.

10. The theme park photograph tracking and retrieval system according to claim 7 wherein said photography database is configured as a server.

11. The theme park photograph tracking and retrieval system according to claim 7 wherein the pictures stored in said photography database are in an exchangeable image file format (Exif).

12. A method for operating a theme park photograph tracking and retrieval system comprising:
   carrying by a theme park photographer at least one bar code pad, with each bar code pad comprising a plurality of distinct bar codes, with the distinct bar codes being given to theme park guests having their picture taken;
   carrying by the theme park photographer at least one camera to take pictures of the distinct bar codes and of theme park guests, with a picture of a distinct bar code being taken prior to taking at least one picture of the theme park guest; and
   operating a photography database to interface with the at least one camera and comprising
      storing the pictures of the distinct bar codes and of the theme park guests in the order in which they were taken so that the distinct bar codes separate the respective pictures of the theme park guests, and
      retrieving stored pictures based on the distinct bar codes being presented by the theme park guests by
         detecting the stored distinct bar code matching the distinct bar code presented by the theme park guest, and
         detecting a sequentially stored next distinct bar code that does not match the distinct bar code presented by the theme park guest, with all pictures between the matching distinct bar code and the non-matching sequentially stored next distinct bar code being retrieved.

13. The method according to claim 12 further comprising displaying the retrieved pictures.

14. The method according to claim 12 wherein the at least one camera comprises a memory card for storing the pictures of the distinct bar codes and of theme park guests; and wherein the photography database comprises at least one memory card slot for receiving the memory card.

15. The method according to claim 12 wherein the photography database comprises an external cable interface; and wherein the at least one camera comprises a non-removable memory for storing the pictures of the distinct bar codes and of theme park guests, and an external cable for interfacing between the non-removable memory and the external cable interface.

16. The method according to claim 12 wherein the photography database is configured as a server.

17. The method according to claim 12 wherein the pictures stored in the photography database are in an exchangeable image file format (Exif).

\* \* \* \* \*